US008602507B2

(12) United States Patent
Vollert et al.

(10) Patent No.: US 8,602,507 B2
(45) Date of Patent: Dec. 10, 2013

(54) METHOD FOR CONTROLLING THE ACTIVATION OF A HYDRAULIC VEHICLE BRAKE SYSTEM AND ELECTROMECHANICAL BRAKE BOOSTER

(75) Inventors: Herbert Vollert, Vaihingen/Enz (DE); Reinhard Weiberle, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 13/140,753

(22) PCT Filed: Oct. 28, 2009

(86) PCT No.: PCT/EP2009/064199
§ 371 (c)(1),
(2), (4) Date: Jun. 17, 2011

(87) PCT Pub. No.: WO2010/069659
PCT Pub. Date: Jun. 24, 2010

(65) Prior Publication Data
US 2011/0248559 A1    Oct. 13, 2011

(30) Foreign Application Priority Data
Dec. 18, 2008  (DE) .......................... 10 2008 054 859

(51) Int. Cl.
*B60T 13/66* (2006.01)
(52) U.S. Cl.
USPC .......................................... 303/114.1; 303/3
(58) Field of Classification Search
USPC .......... 303/113.1–113.5, 115.2, 116.1, 116.2, 303/10, 152, 114.1
See application file for complete search history.

(56) References Cited

U.S. PATENT DOCUMENTS

| 4,395,883 A | 8/1983 | Melinat |
| 4,603,918 A * | 8/1986 | Leiber et al. .................. 303/9.75 |
| 4,643,487 A * | 2/1987 | Neubrand ................... 303/114.1 |
| 6,132,015 A * | 10/2000 | Aoyama ........................ 303/152 |
| 7,926,888 B2 * | 4/2011 | Reuter et al. ................... 303/151 |
| 2003/0024245 A1 | 2/2003 | Fulks et al. |
| 2003/0168909 A1 | 9/2003 | Kusano |
| 2005/0017574 A1 | 1/2005 | Weiberle et al. |
| 2007/0296264 A1 * | 12/2007 | Haupt et al. ....................... 303/3 |

FOREIGN PATENT DOCUMENTS

| DE | 19939950 A1 | 5/2000 |
| DE | 10057557 A1 | 12/2001 |
| DE | 10319663 A1 | 11/2004 |
| DE | 102004050103 A1 | 4/2006 |

(Continued)

OTHER PUBLICATIONS

International Search Report corresponding to PCT Application No. PCT/EP2009/064199, mailed Aug. 27, 2010 (German and English language document) (10 pages).

(Continued)

*Primary Examiner* — Christopher Schwartz
(74) *Attorney, Agent, or Firm* — Maginot, Moore & Beck

(57) ABSTRACT

A method for controlling the activation of a hydraulic vehicle brake system of a hybrid vehicle, which can be braked by generator operation of an electric drive motor, includes compensating for the braking effect of the electric drive motor and reducing a wheel brake pressure in the wheel brakes of the vehicle wheels by opening brake pressure-reducing valves, which are braked with the electric drive motor.

14 Claims, 2 Drawing Sheets

(56) References Cited

FOREIGN PATENT DOCUMENTS

| | | |
|---|---|---|
| DE | 102007043592 A1 | 5/2008 |
| DE | 102007028070 A1 | 12/2008 |
| JP | 2000-261002 A | 9/2000 |
| JP | 200267909 A | 3/2002 |
| JP | 2007-500104 A | 1/2007 |
| JP | 2007131130 A | 5/2007 |
| WO | 2004101308 A1 | 11/2004 |
| WO | 2007080106 A1 | 7/2007 |
| WO | 2008/058985 A1 | 5/2008 |
| WO | 2010069689 A1 | 6/2010 |

OTHER PUBLICATIONS

Co-Pending U.S. Appl. No. 13/140,976, entitled Brake System for a Motor Vehicle and Method for Controlling the Same, filed Jun. 20, 2011, to Vollert et al.

* cited by examiner

METHOD FOR CONTROLLING THE ACTIVATION OF A HYDRAULIC VEHICLE BRAKE SYSTEM AND ELECTROMECHANICAL BRAKE BOOSTER

This application is a 35 U.S.C. §371 National Stage Application of PCT/EP2009/064199, filed Oct. 28, 2009, which claims the benefit of priority to Serial No. 10 2008 054 859.6, filed Dec. 18, 2008 in Germany, the disclosures of which are incorporated herein by reference in their entirety.

BACKGROUND

The disclosure relates to a method for controlling the activation of a hydraulic vehicle brake system, which has a brake booster, of a motor vehicle which has an electric drive motor. Furthermore, the disclosure relates to an electromechanical brake booster designed specifically for the method described herein. There is no differentiation here between open-loop control and closed-loop control (open-loop control within the context of the disclosure also comprising closed-loop control, and vice versa). Brake activation refers to the activation of the vehicle brake system by a vehicle driver using muscle force applied by a foot or hand. The motor vehicle may be an electric vehicle driven exclusively by one electric drive motor or else by a plurality of electric drive motors. In particular, the disclosure is provided for a hybrid vehicle which has an internal combustion engine and, in addition, one or more electric drive motors. In order to recover energy, for braking, the electric drive motor can be operated as a generator. A driving torque for driving the electric drive motor as a generator decelerates the motor vehicle in the form of a braking torque. The electric current generated by the generator mode is stored in a battery and is available for driving the motor vehicle by means of the electric drive motor.

A braking action of the electric drive motor in the generator mode is dependent, inter alia, on the vehicle speed and, for example, also on the state of charge of the battery, and, when the battery is fully charged, the braking action is virtually zero. Even at a low speed, the braking action is low and is reduced to zero as the vehicle stops. The motor vehicle therefore has to be braked jointly with the hydraulic vehicle brake and the electric drive motor in the generator mode, wherein the portion which the hydraulic vehicle brake system has to contribute to the braking fluctuates between zero and one hundred percent. The control of the portions contributed to the braking action by the electric drive motor in the generator mode and by the hydraulic vehicle brake system is referred to as "blending".

It is possible to leave the "blending" to the vehicle driver, i.e. the latter adapts his/her muscle force to activating the braking action of the electric drive motor in the generator mode.

An indispensable demand imposed on the braking of a motor vehicle with an electric drive motor in the generator mode is that the braking distance must not be extended.

In electrohydraulic vehicle brake systems, the blending is possible in a comparatively simple manner without being noticed by the vehicle driver. Electrohydraulic vehicle brake systems are power-brake systems in which the energy required for brake activation does not originate from the muscle force of a vehicle driver but exclusively from an external energy supply device, and the brake pressure is generated by a hydraulic pump. The vehicle driver prescribes a desired value for the brake force at a brake pedal.

Hydraulic vehicle brake systems are known per se and will not be explained in more detail here. Hydraulic vehicle brake systems are also known with wheel slip control, said systems having, for each wheel brake, a brake pressure buildup valve and a brake pressure reduction valve, with which a wheel brake pressure and therefore a braking force of the particular wheel brake can be modulated, i.e. can be controlled by open-loop and closed-loop control, for the purpose of slip control. The wheel brake pressure can either be reduced in order to avoid locking of a vehicle wheel during braking, or a wheel brake pressure can be built up in order to avoid or to limit spinning of a driven vehicle wheel during starting up and/or accelerating, and also individual vehicle wheels can be braked in a specific manner in order to reduce a tendency to skid in critical driving situations.

Vacuum brake boosters, the structure and function of which is known and therefore will not be explained here, can be considered to be customary nowadays. Electromechanical brake boosters which generate an auxiliary force, for example electromotively or electromagnetically, for activating a master brake cylinder are also known. For example, an electromechanical brake booster with a solenoid or a linear motor for generating the auxiliary force for brake activation is known from laid-open application DE 100 57 557 A1. In the same manner as a vacuum brake booster, an electromechanical brake booster, in addition to a muscle force exerted by a vehicle driver, also exerts the auxiliary force, which said brake booster generates, on a master brake cylinder of the vehicle brake system in order to build up a brake pressure.

The disclosure can also be used for motor vehicles or other vehicles which have a generator which is used for braking without being an electric drive motor.

SUMMARY

The hydraulic vehicle brake system, for the control of which, upon brake activation, the method according to the disclosure is provided, has a master brake cylinder which can be activated by muscle force, i.e. by a foot or hand, and to which a hydraulic wheel brake, for example a disk or drum brake, is connected. A brake booster increases the activation force of the master brake cylinder. Said brake booster is provided per se, but is not absolutely necessary for the method according to the disclosure. In addition, a hydraulic accumulator is connected to the vehicle brake system via a controllable valve, in particular a solenoid valve and, preferably, for better controllability, a proportional valve.

As explained at the beginning, the motor vehicle which is equipped with and is to be braked by the vehicle brake system is in particular an electric vehicle or hybrid vehicle with an electric drive motor which can be operated as a generator for braking of the motor vehicle. Whether the electric drive motor is operated as a generator during braking and what portion said electric drive motor contributes to the braking action are dependent on the particular driving situation, in particular on the vehicle speed and the required brake force or braking action and, for example, also on the state of charge of a battery which is charged with the electric current generated by the electric drive motor of the motor vehicle in the generator mode. The portion contributed by the electric drive motor in the generator mode to the braking action fluctuates and lies between zero and one hundred percent.

According to the disclosure, opening of the valve causes a brake fluid volume to be conducted into the hydraulic accumulator if, upon brake activation, the electric drive motor is operated as a generator. The brake pressure in the wheel brake or in the vehicle brake system is reduced as a result, as is the braking action of the wheel brakes concerned. According to the disclosure, the braking action of the hydraulic brake system is therefore reduced and, as a result, the braking action of the electric drive motor in the generator mode is fully or partially compensated for. In order to control the brake pressure and the braking action, the valve is partially or temporarily opened and can be controlled in a modulated manner, as during slip control.

The disclosure has the advantage of permitting the same pedal sensation and pedal behavior upon brake activation with the electric drive motor in the generator mode as without the braking action of the electric drive motor. A vehicle driver notices nothing of the blending operation, i.e. that some of the braking action is brought about by the electric drive motor in the generator mode, even if the portion fluctuates during braking. A dependency between a position of a brake pedal, a pedal force and the braking action is independent of the generator mode of the electric drive motor or, at any rate, the change in the dependency is so slight that the vehicle driver is not aware of it. However, the disclosure is implemented even if the dependency between the pedal position, pedal force and braking action does noticeably change. In a manually activated vehicle brake system, the pedal position and pedal force are replaced by a manual brake lever position and the manual force exerted on the manual brake lever.

The brake booster disclosed herein is designed specifically for carrying out the method disclosed herein.

BRIEF DESCRIPTION OF THE DRAWING

The disclosure is explained in more detail below with reference to an embodiment which is illustrated in the drawing, in which.

DETAILED DESCRIPTION

Figure 1:
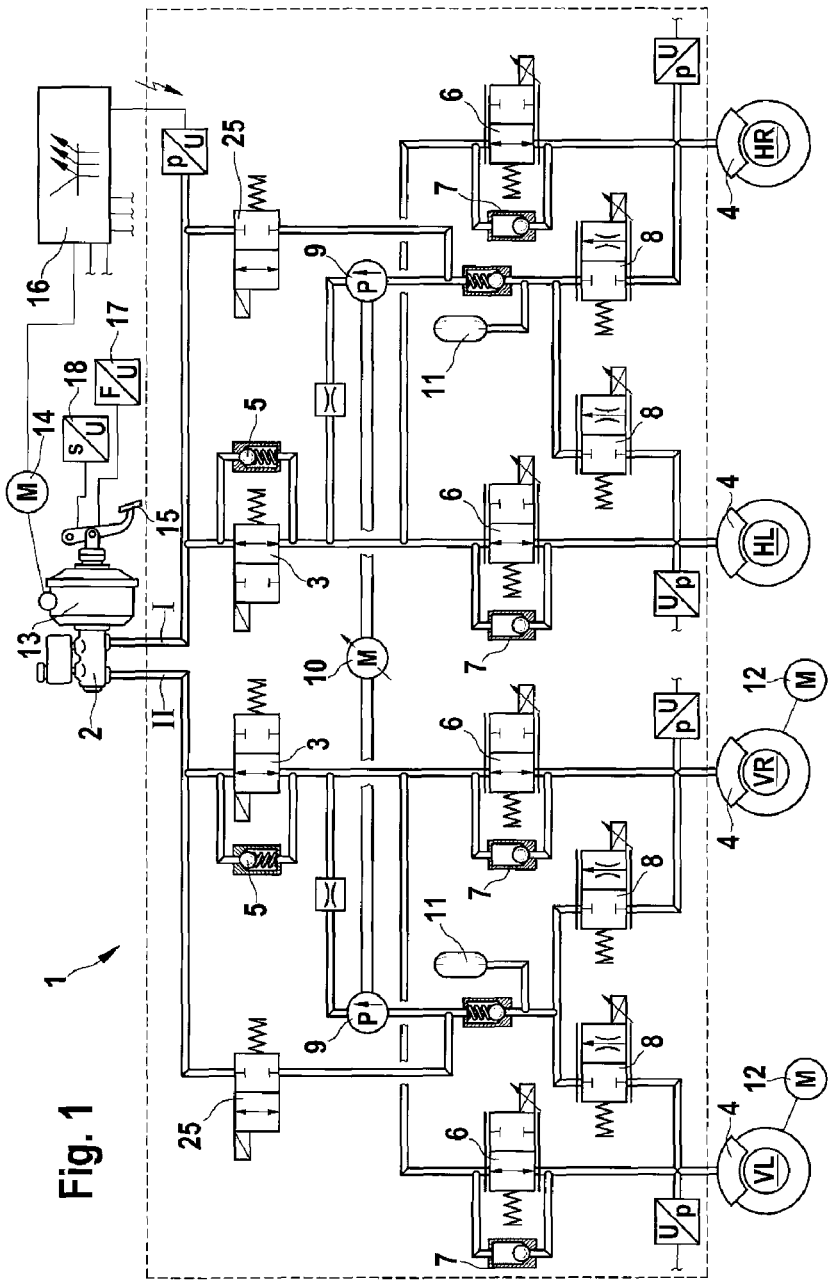
FIG. 1 shows a hydraulic circuit plan of a hydraulic vehicle brake system for carrying out the method according to the disclosure.

The hydraulic vehicle brake system 1 according to the disclosure and illustrated in the drawing has a wheel slip control system (anti-lock control system ABS; drive slip control system ASR; vehicle dynamics control system FDR, ESP). It is designed as a dual circuit brake system with two brake circuits I, II, which are connected to a master brake cylinder 2. Each brake circuit I, II is connected to the master brake cylinder 2 via an isolating valve 3. In their de-energized home position, the isolating valves 3 are open 2/2-way solenoid valves. A check valve 5, through which fluid can flow from the master brake cylinder 2 to wheel brakes 4, is connected hydraulically in parallel with each of the isolating valves 3. The wheel brakes 4 are connected to the isolating valve 3 of each brake circuit I, II via brake pressure buildup valves 6. In their de-energized home position, the brake pressure buildup valves 6 are open 2/2-way solenoid valves. Check valves 7, through which fluid can flow from the wheel brakes 4 in the direction of the master brake cylinder 2, are connected in parallel therewith.

A brake pressure reduction valve 8 is connected to each wheel brake 4, said reduction valves being connected jointly to a suction side of a hydraulic pump 9. The brake pressure reduction valves 8 are designed as 2/2-way solenoid valves which are closed in the de-energized home position thereof. A pressure side of the hydraulic pump 9 is connected between the brake pressure buildup valves 6 and the isolating valves 3, i.e. the pressure side of the hydraulic pump 9 is connected to the wheel brakes 4 via the brake pressure buildup valves 6 and to the master brake cylinder 2 via the isolating valve 3. The brake pressure buildup valves 6 and the brake pressure reduction valves 8 are proportional valves, since these provide better open-loop and closed-loop control.

Each of the two brake circuits I, II has a hydraulic pump 9, which can be driven jointly by means of an electric motor 10. The suction sides of the hydraulic pumps 9 are connected to the brake pressure reduction valves 8. On the suction side of the hydraulic pumps 9 there are hydraulic accumulators 11 for receiving and temporarily storing brake fluid, which flows out of the wheel brakes 4 during slip control due to the opening of the brake pressure reduction valves 8.

The brake pressure buildup valves 6 and the brake pressure reduction valves 8 form wheel brake pressure modulation valve arrangements, by means of which wheel-specific brake pressure control for slip control is possible, in a manner which is known per se and will not be explained here, when the hydraulic pump 9 is being driven. During a slip control operation, the isolating valves 3 are closed, i.e. the vehicle brake system 1 is isolated hydraulically from the master brake cylinder 2.

The suction side of the hydraulic pump 9 can be connected to the master brake cylinder 2 by a suction valve 25 in each brake circuit I, II. The suction valves 25 are 2/2-way solenoid valves which are closed in the de-energized home position thereof. If said valves are opened, the hydraulic pump 9 sucks brake fluid directly out of the master brake cylinder 2, and therefore, when the master brake cylinder 2 is not activated or the vehicle brake system 1 is unpressurized, brake pressure can be built up more rapidly with the hydraulic pump 9.

The motor vehicle equipped with the vehicle brake system 1 has one or more electric drive motors 12 for driving one or more vehicle wheels. By way of example, the drawing illustrates two electric drive motors 12 which drive two vehicle wheels of a vehicle axle, the two front wheels in the exemplary embodiment. A joint electric drive motor may also be used for the drive. In addition, there may be an internal combustion engine (not illustrated in the drawing) for driving the motor vehicle; motor vehicles of this type are referred to as hybrid vehicles.

The master brake cylinder 2 has a brake booster 13, in the exemplary embodiment an electromechanical brake booster 13, which, with the aid of an electric motor 14, generates an auxiliary force which, together with a muscle force applied via a brake pedal 15, activates the master brake cylinder 2. The electric motor 14 (illustrated symbolically) is integrated into the brake booster 13. The electric motor 14 may be a rotary motor, the rotary motion of which is stepped down by means of a gear and converted into a translatory movement to activate the master brake cylinder 2. An embodiment of the brake booster 13 with an electric linear motor or a solenoid is also possible. This list is not exhaustive.

An electronic control unit 16 is present for open-loop or closed-loop control of the vehicle brake system 1, including the brake booster 13 and the electric drive motors 12. A pedal force exerted on the brake pedal 15 can be measured by means of a force sensor 17, and a position and also a speed or acceleration of the brake pedal 15 can be measured by means of a displacement sensor 18.

Upon activation of the brake pedal 15, the electric drive motors 12 are operated as generators if the driving state permits this, in particular if the vehicle speed is high enough. The electric current generated is stored in a battery (not illustrated). A braking action of the vehicle brake system 1 is increased by the electric drive motors 12 which are operated as generators. For compensation purposes, one or more brake pressure reduction valves 8 are opened such that brake fluid flows out of the associated wheel brakes 4 and flows into the hydraulic accumulators 11. The brake pressure reduction valves 8 are preferably opened, the associated wheel brakes 4 of which brake the vehicle wheels which are driven by the electric drive motors 12 and are braked in the generator mode. As a result, braking force distribution to the vehicle wheels, as prevails with the vehicle brake system 1 without the electric drive motors 12 in the generator mode, is maintained. As already stated, the brake pressure reduction valves 8 are proportional valves, and therefore the wheel brake pressure in the wheel brakes 4 can be controlled in such a manner that the braking torque caused by the electric drive motors 12 in the generator mode is compensated or approximately compensated for. A boosting factor of the brake booster is reduced to such an extent that the same pedal force, or at any rate virtually the same pedal force, acts on the brake pedal 15 as would act with the same pedal displacement without the braking action of the electric drive motors 12 in the generator mode, i.e. without the brake pressure being reduced by opening of the brake pressure reduction valves 8. The pedal displacement and pedal force are therefore at least approximately the same as during braking without the electric drive motors 12 in the generator mode, and a vehicle driver is not aware at all that some of the braking action does not involve the vehicle brake system 1 but rather the electric drive motors 12 in the generator mode. This "blending", i.e. the closed-loop control of the portion of the braking action of the vehicle brake system 1 and of the electric drive motors 12 in the generator mode is intended to be imperceptible to the vehicle driver.

The ratio of the portion of the braking action of the vehicle brake system 1 to the braking action of the electric drive motors 12 in the generator mode fluctuates during braking. If the brake force of the vehicle brake system 1 has to be increased, for example because the braking action of the electric drive motors 12 decreases, this can be undertaken by changing the boosting factor of the brake booster 13 and/or by increasing the brake pressure with the hydraulic pump 9. In order to increase the brake pressure, the suction valve 25 can be opened, and therefore the hydraulic pump 9 sucks brake fluid out of the master brake cylinder 2. The suction valves 25 have to be opened if the brake fluid in the hydraulic accumulator 1 is insufficient. The isolating valve 3 can be closed in order to avoid reactions on the master brake cylinder 2 due to pressure pulsations of the hydraulic pump 9. Pressure pulsations of this type can be felt in the brake pedal 15. They are design-induced due to the discontinuous feeding manner of piston pumps which are customarily used.

The brake pressure reduction valves 8 and the hydraulic accumulator 11, with which the wheel brake pressure in the wheel brakes 4 can be reduced, are present in a vehicle brake system 1 having a slip control device. The method according to the disclosure therefore does not require any additional hydraulic components.

The electromechanical brake booster 13 permits easier open-loop or closed-loop control of the boosting factor than, for example, a vacuum brake booster, and therefore an electromechanical brake booster 13 is preferred. A further advantage of the electromechanical brake booster 13 is the possibility of subjecting the brake pedal 15 to a force which is directed counter to the activation of the master brake cylinder 2. This may also be understood as a negative boosting factor of the brake booster 13. As a result, it is possible to generate the customary pedal force on the brake pedal 15 when the brake pressure in the vehicle brake system 1 is too low to bring about the customary pedal force because the brake pressure is lowered too severely for this by the brake pressure reduction valves 8.

Figure 2:
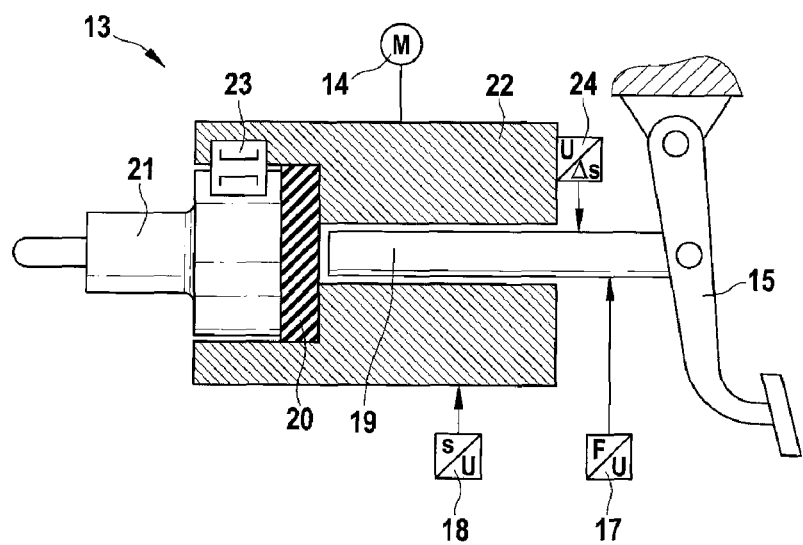
FIG. 2 shows a schematic illustration of an electromechanical brake booster according to the disclosure.

FIG. 2 shows an embodiment of the electromechanical brake booster 13 in a schematized, simplified illustration. The brake booster 13 has a piston rod 19 which is connected in an articulated manner to the brake pedal 15 and with which a muscle force exerted on the brake pedal 15 can be transmitted via a reaction disk 20 to a plunger rod 21. The plunger rod 21 acts in a customary manner upon a piston of the master brake cylinder 2 (not illustrated in FIG. 2). In addition, the brake booster 13 has an electromechanical actuator 22, with which an auxiliary force can be transmitted, likewise via the reaction disk 20, to the plunger rod 21. The auxiliary force is the force generated by the actuator 22. The electric motor 14, which may also be a linear motor, is illustrated symbolically for generating force. Auxiliary force can also be generated using a solenoid (not illustrated). The reaction disk 20 is a rubber-elastic body which transmits the muscle force from the pedal rod 19 and the auxiliary force generated by the actuator 22 to the plunger rod 21 in the form of compressive forces. Therefore, force can be transmitted from the brake booster 13 to the master brake cylinder 2 only with the effect of activating the master brake cylinder 2.

In order, with the actuator 22 of the brake booster 13, to be able to exert the force, which is described further above and is directed counter to the activation direction, on the piston rod 19, the brake booster 13 has an engaging and disengaging coupling 23, for example a magnetic coupling. In the embodiment illustrated in FIG. 2, the actuator 22 can be connected to the plunger rod 21 by the coupling 23 such that a force which is directed counter to the activation direction of the master brake cylinder 2, i.e. acts to the right in FIG. 2, can be exerted by the actuator 22 via the coupling 23, the plunger rod 21 and the reaction disk 20 on the piston rod 19, which is connected to the brake pedal 15 in an articulated manner. The coupling 23 makes it possible for the actuator 22 to generate a pedal force which is directed counter to the activation direction of the master brake cylinder 2 if a hydraulic pressure in the vehicle brake system 1, and consequently in the master brake cylinder 2, does not suffice in order to bring about a pedal force of the desired magnitude on the brake pedal 15. As a result, it is possible always to generate the customary or usual pedal force, which is dependent on the pedal displacement, even if the hydraulic pressure in the vehicle brake system 1 has been reduced in order to compensate for the braking action of the electric drive motors 12 in the generator mode. Even if the master brake cylinder 2 is unpressurized, it is possible in principle for a pedal force of any size to be generated by the actuator 22 of the brake booster 13.

The coupling 23 is understood in general as meaning an element via which a force, which is directed counter to an activation direction of the master brake cylinder 2, can be transmitted by the actuator 22 to the pedal rod 19 when the coupling 23 is closed. The coupling 23 may also be arranged differently than shown, for example such that it connects the actuator 22 to the pedal rod 19. The force which can be transmitted with the coupling 23 is preferably limited, and therefore muscle force activation of the master brake cylinder 2 is possible when the coupling 23 is closed, even if the actuator 22 is blocked or upon activation of an oppositely directed force of the actuator 22. For the open-loop or closed-loop control, apart from the force sensor 17 and the displacement sensor 18, the brake booster 13 has a position sensor 24 with which displacement of the pedal rod 19 in relation to the actuator 22 can be measured. The coupling 23 is designed in such a manner that it can be engaged even when the piston rod 19 is displaced in relation to the actuator 22.

The invention claimed is:

1. A method for controlling the activation of a hydraulic vehicle brake system of a motor vehicle which has an electric drive motor which can be operated as a generator in order to brake the motor vehicle, wherein the vehicle brake system has a master brake cylinder which can be activated by muscle force applied to a muscle-force actuation element and to which a wheel brake is connected, and a hydraulic accumulator which is connected to the vehicle brake system via a valve, comprising:
   if, upon brake activation, the electric drive motor is operated as a generator, opening of the valve causes a brake fluid volume to be conducted into the hydraulic accumulator and, as a result, a wheel brake pressure in the wheel brake is reduced; and
   generating a force to counter the actuation of the master brake cylinder by the muscle force actuation element when a brake pressure in the vehicle brake system does not provide a conventional muscle force at the muscle-force actuation element, wherein an electromechanical brake force booster coupled to the master brake cylinder generates the force to counter the actuation of the master brake cylinder.

2. The method as claimed in claim 1, a dependency of the motor vehicle deceleration on the muscle force for activation of the master brake cylinder and/or on an activation distance is the same as for braking without the generator mode of the electric drive motor.

3. The method as claimed in claim 1, wherein a boosting factor of the electromechanical brake force booster is reduced upon brake activation with the generator mode of the electric drive motor.

4. The method as claimed in claim 1, wherein:
   the vehicle brake system has slip control, and
   the valve is a brake pressure reduction valve which is connected to the wheel brake during slip control in order to reduce the wheel brake pressure.

5. The method as claimed in claim 1, wherein the vehicle brake system has a hydraulic pump with which a wheel brake pressure can be generated and increased in the wheel brake.

6. The method as claimed in claim 1, wherein the wheel brake pressure is reduced in the wheel brakes of the vehicle wheels, which are braked with the electric drive motor in the generator mode.

7. The method as claimed in claim 1, wherein the electromechanical brake force booster permits a relative movement between a muscle force activation element of the master brake cylinder and a piston of the master brake cylinder.

8. The method as claimed in claim 1, wherein the electromechanical brake force booster which, upon brake activation, exerts an auxiliary force in addition to the muscle force on the master brake cylinder.

9. An electromechanical brake booster for boosting a muscle force applied by a muscle-force activation element and exerted on a master brake cylinder in an activation direction of a hydraulic vehicle brake system for brake activation, the master brake cylinder including a piston, the electromechanical brake booster comprising:
   an electromechanical actuator configured to provide an actuator force acting as an auxiliary force upon the piston of the master brake cylinder and a coupling which, in an engaged state, connects the electromechanical actuator to the muscle force activation element such that the actuator force from the electromechanical actuator is directed counter to the activation direction of the master brake cylinder and is transmitted to the muscle force activation element.

10. The brake booster as claimed in claim 9 wherein the coupling comprises a magnetic coupling.

11. The brake booster as claimed in claim 10 further comprising a plunger rod operatively coupled to the piston wherein the actuator is operatively coupled to the coupling such that the actuator force from the electromechanical actuator-is directed counter to the activation direction of the master brake cylinder.

12. The brake booster as claimed in claim 11 further comprising a reaction disk operatively coupled to the plunger rod and to the muscle force actuation element, wherein the reaction disk is configured to transmit a force from the muscle force actuation element to the plunger rod.

13. The brake booster as claimed in claim 12 wherein the reaction disk comprises a rubber-elastic body to transmit the force from the muscle force actuation element to the plunger rod in the form of compressive forces.

14. The brake booster as claimed in claim 9, wherein the maximum force which can be transmitted by the coupling is limited.

* * * * *